US00RE46783E

(19) United States
(12) Reissued Patent
Cook et al.

(10) Patent Number: US RE46,783 E
(45) Date of Reissued Patent: Apr. 10, 2018

(54) METHOD OF PROCESSING PRE-PRINTED CARDS

(71) Applicant: Longford International Ltd., Scarsborough (CA)

(72) Inventors: Edward J. Cook, Toronto (CA); Brian C. Greiner, Toronto (CA); Naofumi Tateishi, Toronto (CA)

(73) Assignee: LONGFORD INTERNATIONAL LTD., Scarsborough, Ontario (CA)

(21) Appl. No.: 14/308,665

(22) Filed: Jun. 18, 2014

Related U.S. Patent Documents

Reissue of:
(64) Patent No.: 8,204,309
Issued: Jun. 19, 2012
Appl. No.: 11/743,798
Filed: May 3, 2007

(51) Int. Cl.
*G06K 9/18* (2006.01)
*G06T 7/00* (2017.01)

(52) U.S. Cl.
CPC . *G06K 9/18* (2013.01); *G06T 7/00* (2013.01)

(58) Field of Classification Search
CPC ..... G06K 9/18; G06T 7/00
USPC ..... 382/181, 184; 209/509, 547
See application file for complete search history.

(56) References Cited

U.S. PATENT DOCUMENTS 4,277,176 A 7/1981 Grosvernier
4,651,983 A 3/1987 Long
5,351,834 A 10/1994 Duss
5,575,475 A * 11/1996 Steinbach ..... 273/149 R
5,989,122 A 11/1999 Roblejo
6,429,945 B1 8/2002 Loffler
8,342,932 B2 * 1/2013 Fleckenstein ..... 463/12
2001/0054576 A1 * 12/2001 Stardust et al. ..... 209/587
2004/0108255 A1 6/2004 Johnson
2005/0040594 A1 * 2/2005 Krenn et al. ..... 273/149 R
2005/0110210 A1 * 5/2005 Soltys et al. ..... 273/149 P
2006/0063577 A1 * 3/2006 Downs, III ..... A63F 1/18 463/11
2008/0001356 A1 * 1/2008 Franks ..... 273/148 R

* cited by examiner

*Primary Examiner* — Joseph R Pokrzywa

(74) *Attorney, Agent, or Firm* — Wolf, Greenfield & Sacks, P.C.

(57) ABSTRACT

After pre-printed cards are manufactured at least a corner of each card is imaged. It is then determined whether the position and orientation of markings in the image with respect to the corner are within tolerance. If not, the card is rejected. If the markings are, or include, indicia, these indicia may be identified to allow identification of the card. This allows a determination of whether the card is in an intended order, or it allows selection of the batch into which the card is placed. It also means that cards in a given set of cards arranged in a first order can be randomized by first buffering cards in buffers and then outputting the cards to an output conveyor.

28 Claims, 9 Drawing Sheets

METHOD OF PROCESSING PRE-PRINTED CARDS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

This invention relates to a method and machine for processing pre-printed cards.

One popular type of pre-printed cards are trading cards such as player trading cards that are available for players on professional sports teams like hockey and baseball. Trading cards are also available for a variety of games. Trading cards are typically sold as small packs in sealed packages, where each pack contains the same number of cards, but the cards in the pack are random. Thus, the purchaser will not know in advance which cards from a series of cards he will find in the pack. This motivates the purchaser to engage in trading to get cards of interest. A manufacturer of trading cards will be concerned that the cards achieve quality control standards and also that the cards in a package are appropriately random. For example, the manufacturer may wish to make certain cards rarer than others to enhance collector excitement.

Another popular type of pre-printed card are playing cards. A new deck of playing cards is typically packaged in a box in an order wherein cards in the suit of hearts are first, followed by those in the suit of spades, followed by those in the suit of clubs, followed by those in the suit of diamonds. The (thirteen) cards in each suit are typically arranged in the order of King, Queen, Jack, 10, 9, 8, 7, 6, 5, 4, 3, 2, and Ace. A number (typically four) of extra cards, such as Jokers, may be positioned at either the top or bottom of the new deck. This conventional order has the advantage that a purchaser may quickly verify the newly purchased deck is complete. Again, a manufacturer of these cards will be concerned that the cards meet quality control standards and that each deck of cards has the cards it is supposed to have.

To manufacture playing cards or trading cards, a sheet may be imprinted with card images. Cards may then be die cut from the sheet and gathered into batches. The card images may be printed on the sheet in an order which facilitates processing. For example, in the case of playing cards, a sheet may be printed with 56 card images as seven rows with eight images per row with the order of the card images being chosen to facilitate assembly of a batch of cards into a full deck of cards in the noted conventional order.

Unfortunately, a card may stick to a die head during the cutting operation. If this occurs, the card may be cut a second time, possibly after being skewed such that the card ends up having non-standard cuts. Also, the sheets may fall out of registration with the die cutting heads resulting in card images which are not centered. Other cutting errors may also occur. Further, printing errors are possible, especially with multi-coloured cards, where one colour may not be printed in its intended location with respect to other colours printed on the card. These problems are quality control problems.

Another potential problem during card handling is that the cards do not end up in their intended order.

SUMMARY OF INVENTION

After pre-printed cards are manufactured at least a corner of each card is imaged. It is then determined whether the position and orientation of markings in the image with respect to the corner are within tolerance. If not, the card is rejected. If the markings are, or include, indicia, these indicia may be identified to allow identification of the card. This allows a determination of whether the card is in an intended order, or it allows selection of the batch into which the card is placed.

In another aspect, cards in a given set of cards arranged in a first order are randomized by first buffering cards in buffers and then outputting the cards to an output conveyor. In one approach, each unique card in the set is sent to a different buffer such that like cards are buffered in the same buffer. Cards are then randomly fed from the buffers to form a re-ordered set of cards such that cards in the re-ordered set of cards have an order that is random with respect to the first order. In another approach, each buffer is allocated to at least one ordinal position. Then, after determining a random order for a set of cards, individual cards of the set are fed to the buffers such that each card is fed to a buffer having an ordinal position matching an ordinal position of the card in the random order. The cards are then fed out from each of the buffers to the output conveyor based on ordinal positions of the buffers.

Other features and advantages will be apparent from a review of the following description in conjunction with the figures.

BRIEF DESCRIPTION OF THE DRAWINGS

In the figures which illustrate an example embodiment of the invention.

DETAILED DESCRIPTION

Figure 1:
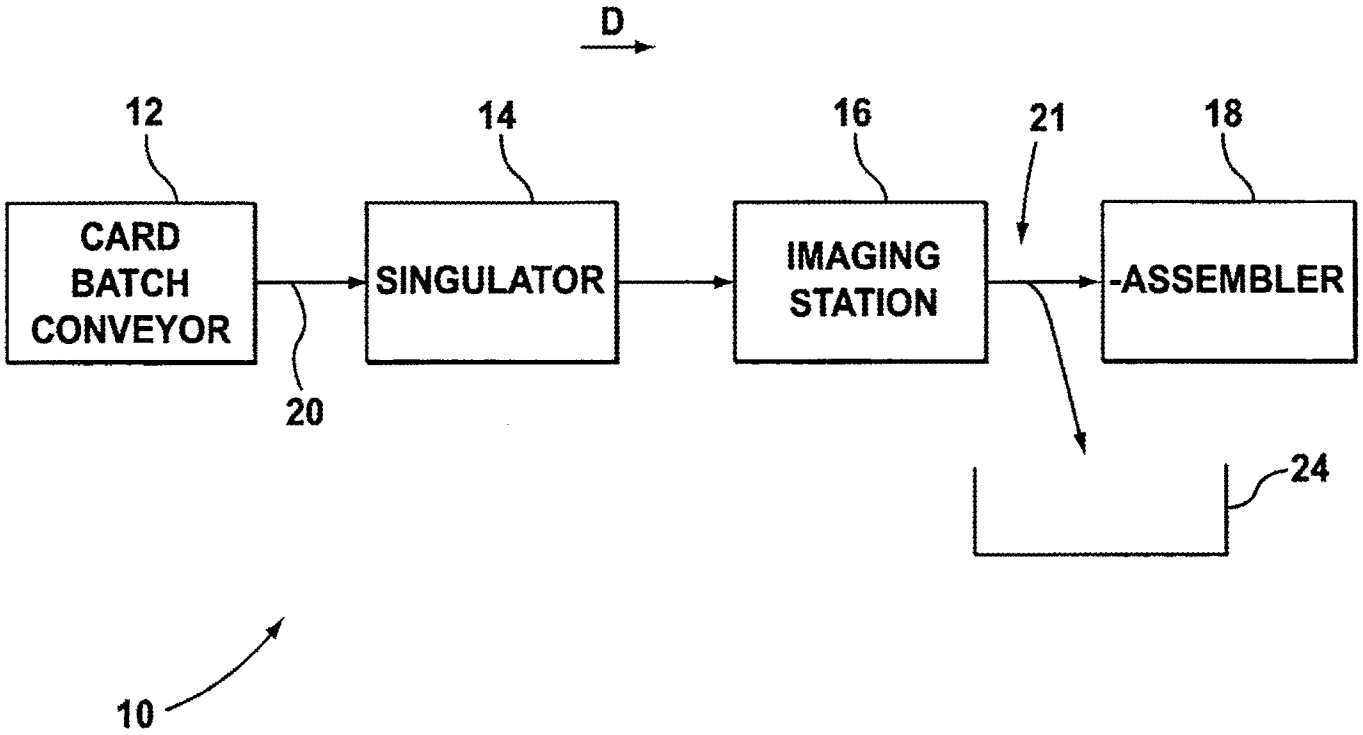
FIG. 1 is a schematic view of a machine made in accordance with an aspect of this invention.
Figure 1A:
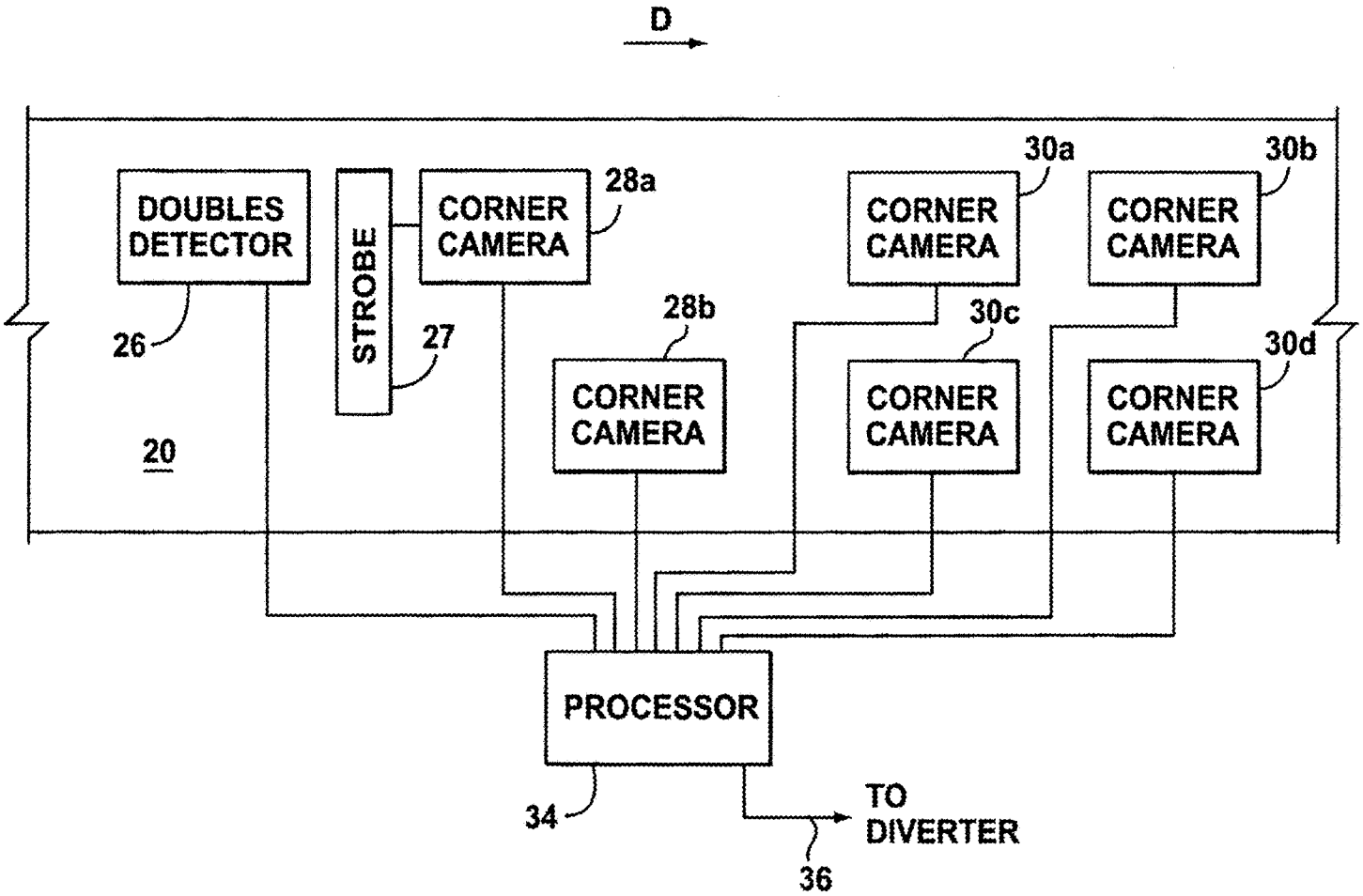
FIG. 1A is a schematic view of the control arrangement for the machine of FIG. 1.

Turning to FIG. 1, a machine 10 to process pre-printed cards comprises, in downstream order D, a card batch conveyor 12, a card singulator 14, an imaging station 16, and an assembler 18 linked by a card conveyor 20. Downstream of the imaging station, a diverter 21 may divert cards into a reject bin 24. An exemplary imaging station is detailed in FIG. 1A. The imaging station comprises a doubles detector 26, a pair of corner cameras 28t, 28b and an associated strobe light 27, and four corner detectors 30a, 30b, 30c, and 30d all of which overlie the conveyor 20 and all of which are operatively connected to a processor 34. The processor is also operatively connected to the diverter 24 through a control line 36.

The card batch conveyor 12 could simply be a hopper into which cards are manually stacked. Alternatively, the card batch conveyor could be a transfer conveyor and hopper where the transfer conveyor automatically transfers stacks of cards from upstream machinery and feeds one stack of cards at a time to the hopper. Each stack of cards may be one or more decks or packs of cards. The singulator 14 could be any known singulator such as the card feeder described in U.S. Pat. No. 4,651,983 issued Mar. 24, 1987, the contents of which are incorporated herein by reference. The assembler 18 may simply be a table with a backstop onto which cards singulated from a stack are re-assembled into the stack. Referencing FIG. 1A, the doubles detector 26 of the imaging station may be an ultrasonic doubles detector which outputs a fault signal to the processor 34 when it senses that more than one card appears beneath it on the conveyor 20. Corner cameras 28t, 28b may be any suitable digital cameras. Corner detectors 30a, 30b, 30c, and 30d may simple black and white imagers. The processor 34 may be any suitable programmed microprocessor. Photodetectors could be associated with the conveyor to sense when a card is under each of the doubles detector, corner cameras, and corner detectors in order to trigger each of these devices (and strobe light 27) to operate at an appropriate time.

In operation, cards are fed singly from the card batch conveyor 12 by the singulator 14 to the imaging station 16. The doubles detector 26 signals a fault to the processor if it detects a situation where there is more than one card under it on the conveyor 20. This could cause the processor to divert the doubled cards to the reject bin. Corner cameras 28t, 28b each image one of two opposed corner portions of each card as the card passes underneath them, and corner detectors 30a, 30b, 30c, and 30d each image one of the four corners of the card. The images obtained by these devices are passed to the processor 34.

Figure 2:
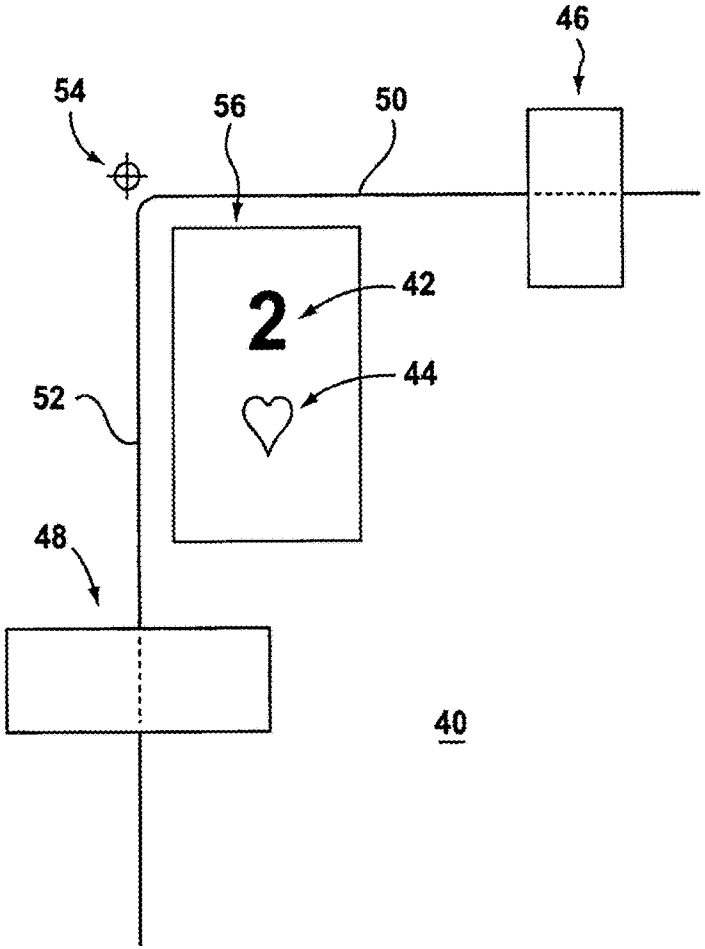
FIG. 2 is a schematic view illustrating processing of an image of a portion of a card.

The processing by processor 34 of an exemplary image obtained by corner camera 28t is illustrated in FIG. 2. The image 40 of a corner portion of a pre-printed playing card has a numerical marking 42 and a marking 44 which is a pip. To process this image, processor 34 first establishes search zones 46 and 48 for the two edges 50 and 52 of the card which meet to form the corner. These edges may be readily identified in each zone as a sharp zone of colour transition if the conveyor is chosen to have a contrasting colour from that of the card. After identifying the edges 50, 52, the processor may establish an X-Y origin 54. The processor will establish a search zone 56 having a pre-determined distance and orientation from the origin 54. The processor then tries to locate pre-determined markings in this search zone. Once the markings 42, 44 are found, the processor then determines whether the location and position of the markings fall within acceptable ranges stored in memory. If the position and orientation of the markings are not within acceptable ranges, the card from which the image is formed is rejected and the processor sends a signal to the diverter 21 so that the card is diverted to the reject bin 24. While it may be possible to properly process cards with only one corner camera, the second camera at an opposed corner increases the likelihood that an out-of-tolerance card will be identified.

The corner detectors 30a, 30b, 30c, and 30d simply provide an image of the corner of the card so that the processor can determine if it does not have the expected shape (indicating that it was subject of an erroneous second cut during formation). Alternatively, the corner camera images could be used to determine the corner shape for two of the corners and two corner detectors could be used to determine the shape of the remaining two corners.

Where the cards are playing cards and one card of a deck is rejected, the entire deck may be rejected (at the assembler 18).

With a playing card and certain trading cards, the markings proximate the corner will be, or will include, indicia and these indicia may be identified through optical character reader (OCR) technology. This is useful where the cards are presented to the card batch feeder as decks of cards which have an intended order that may be verified by the processor. For example, as described before, new decks of playing cards have a conventional predetermined order. By identifying the indicia and noting the progression of indicia from card-to-card, the processor can confirm that a given deck has its intended order. If an error was found in the order, a fault condition can be signaled and, optionally, the entire deck of cards can be rejected (at the assembler).

Figure 3:
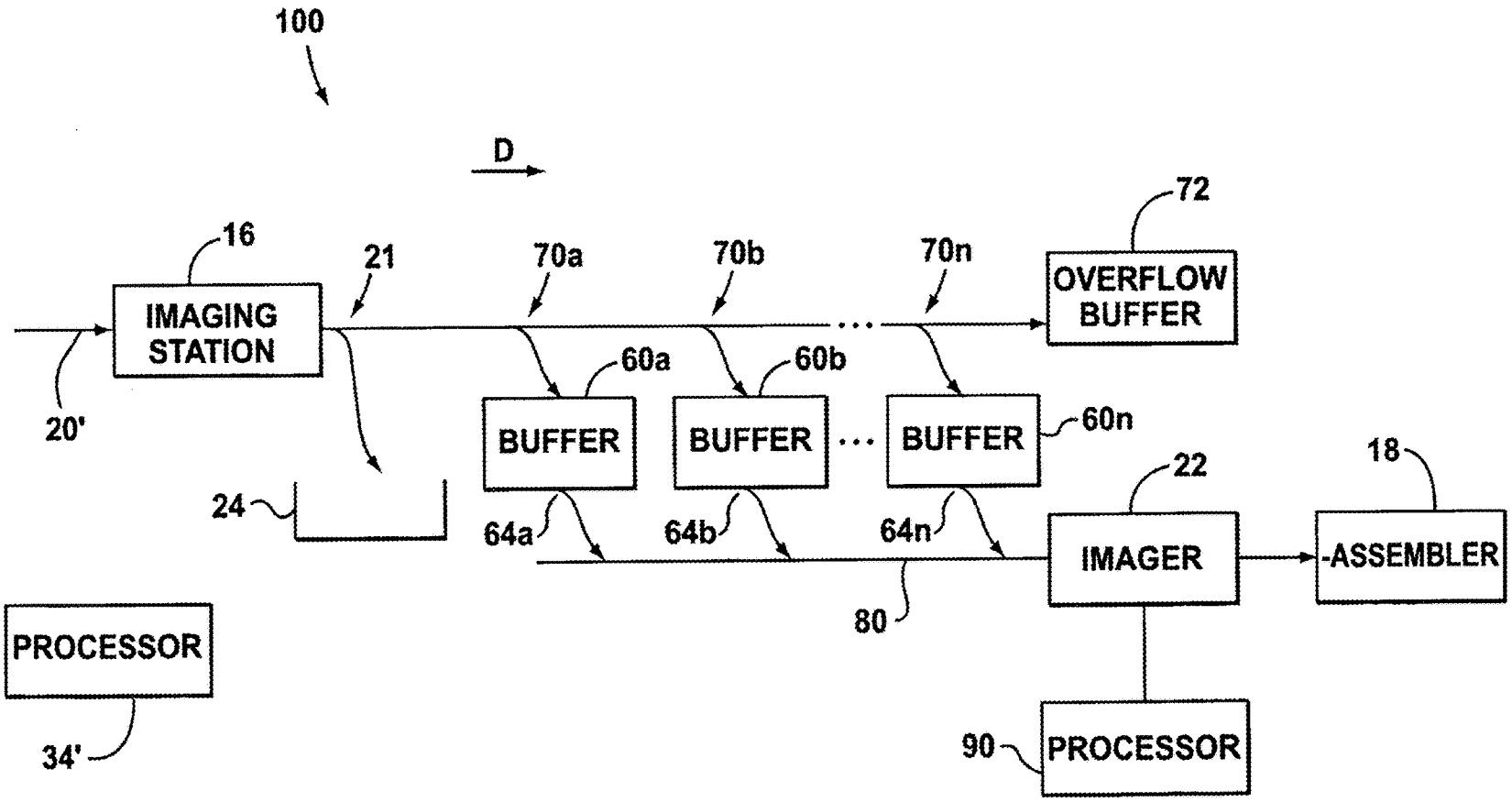
FIG. 3 is a schematic view of a machine made in accordance with another aspect of this invention.
Figure 4:
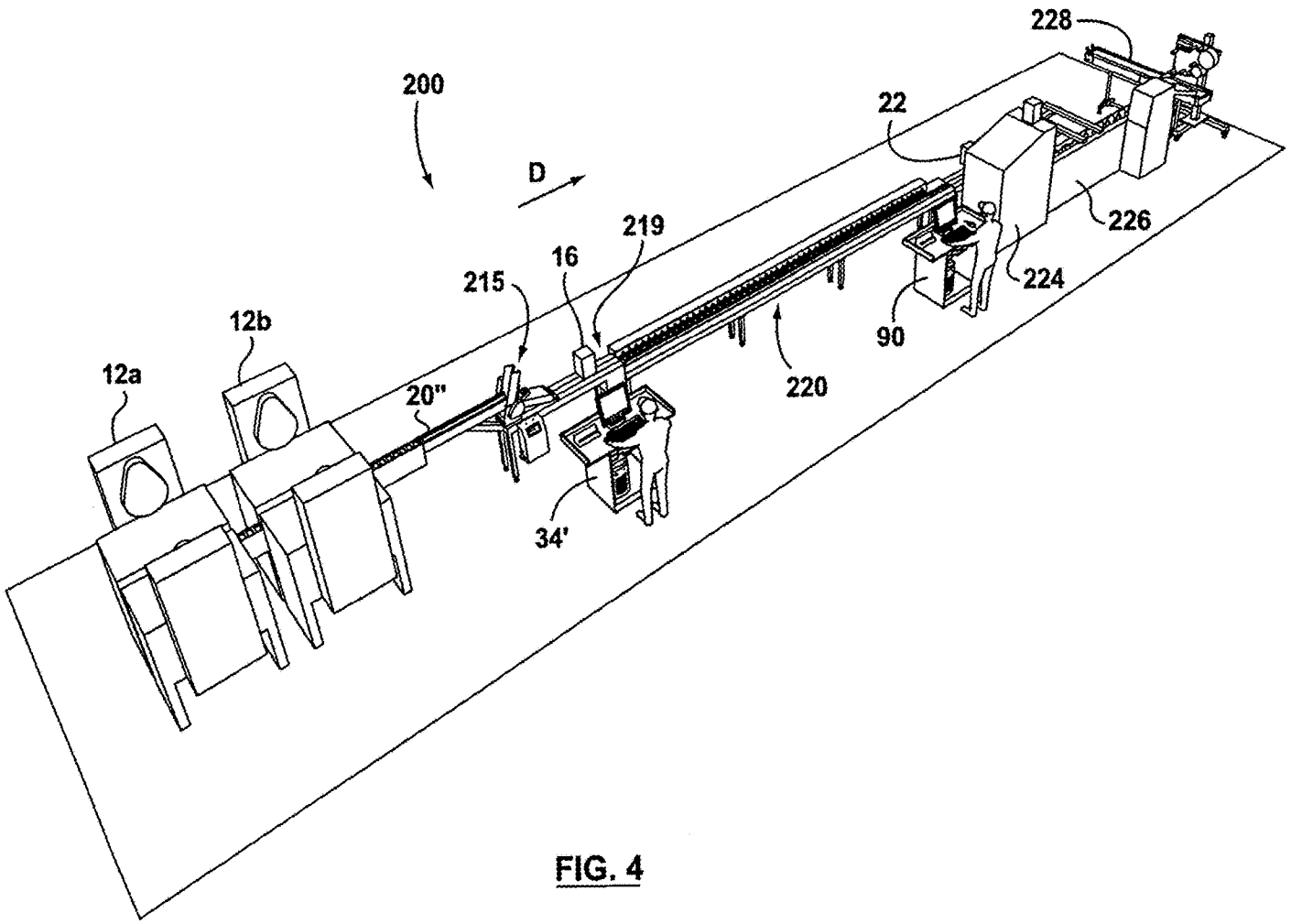
FIG. 4 is a perspective view of a card machine made in accordance with an aspect of this invention.

FIG. 3 illustrates a machine 100 where like parts to the parts of machine 10 of FIG. 1 have been given like reference numerals. Turning to FIG. 3, a card conveyor 20' conveys cards singly through imaging station 16, past diverter 21, and past a series of diverters 70a to 70n downstream of diverter 21. Each of these diverters 70a to 70n can divert cards to an associated one of buffers 60a to 60n. An output of each buffer 60a to 60n has a feeder 64a to 64n for feeding cards to a second conveyor 80. Conveyor 80 feeds cards past an imager 22, connected to a processor 90, to assembler 18. Conveyor 20' terminates at its downstream end in an overflow buffer 72. A processor 34' is interconnected to the devices of the imaging station 16 and has an additional control input to each of the diverters 70a to 70n and each of the feeders 64a to 64n.

In operation, cards are conveyed one at a time on conveyor 20' and imaged at imaging station 16. Now, however, the identification of indicia on cards by the processor has the additional advantage that this information can be used to select one of buffers 60a to 60n in which to feed each identified card. This allows, for example, identical cards to be placed in the same buffer. (And if a given buffer is full, a card can simply be allowed to bypass the buffer and end up in overflow buffer 72). The processor can also control the feeders 64a to 64n so as to selectively feed cards from the buffers and thereby select any desired order for cards on conveyor 80. Imager 22 and its associated processor may be used to verify that any intended set of cards is complete.

Thus, for example, if the cards are trading cards conveyed toward imaging station 16 in a pre-set repeating order, the cards may re-ordered as random, or pseudo-random, sets of cards on conveyor 80 so that the assembler could assemble each set as a random pack of cards. Each pack could then be packaged for sale. In this regard, the processor 34' could enforce any desired rules for the pseudo-randomness of the packs. For example, if there were, say, one hundred different cards, the processor could have a rule requiring that no more than one in one thousand packs have a particular card (that is intended to be a rare card).

It may be that there are more different cards than there are buffers 60a to 60n. In such instance, rather than feeding identical cards to the same buffer, processor 34' could feed cards to buffers so as to establish a pack of cards in each buffer which has a desired random order. As soon as a pack was complete, it could then be feed, singly, to conveyor 80 and then re-assembled by assembler 18. This approach can lead to a significant number of cards entering the overflow buffer 72 as the processor is looking for only certain cards to fill the buffers. In view of this, cards in the overflow buffer could be fed back to the batch conveyor either manually or automatically.

FIGS. 4 to 8 illustrate a machine 200 where like parts to the machine 100 of FIG. 3 have been given like reference numerals and is described as operating with playing cards. Casinos use a great number of decks of cards in large part because decks are frequently replaced to avoid the risk of cards developing identifying markings. Since new decks arrive in a conventional order (described above), they must be shuffled extensively to randomize their order before they can be introduced into play. Even with such shuffling, it can occur that groups of cards retain their original order. This can give a player who recognizes this phenomenon an unintended advantage. The machine 200 can avoid this problem by providing new decks to casinos, which decks have a random order.

Card processing machine 200 comprises, in downstream order D, a pair of die cutting and card singulating units 212a, 212b, a conveyor 20", a card hopper 215, an imaging station 16 operatively connected to a processor 34', a card ejection station 219, a card randomizing section 220, an imager 22 operatively connected to a processor 90, a deck forming and loading unit 224, a carton forming and loading station 226, and a labeling unit 228.

Each of the card cutting and singulating units 212a, 212b may be loaded with a stack of sheets imprinted with images of cards. These units may cut cards from the sheets and output cards in the conventional order for new decks of cards.

Card hopper 215 may be loaded with previously manufactured decks of cards.

Figure 5:
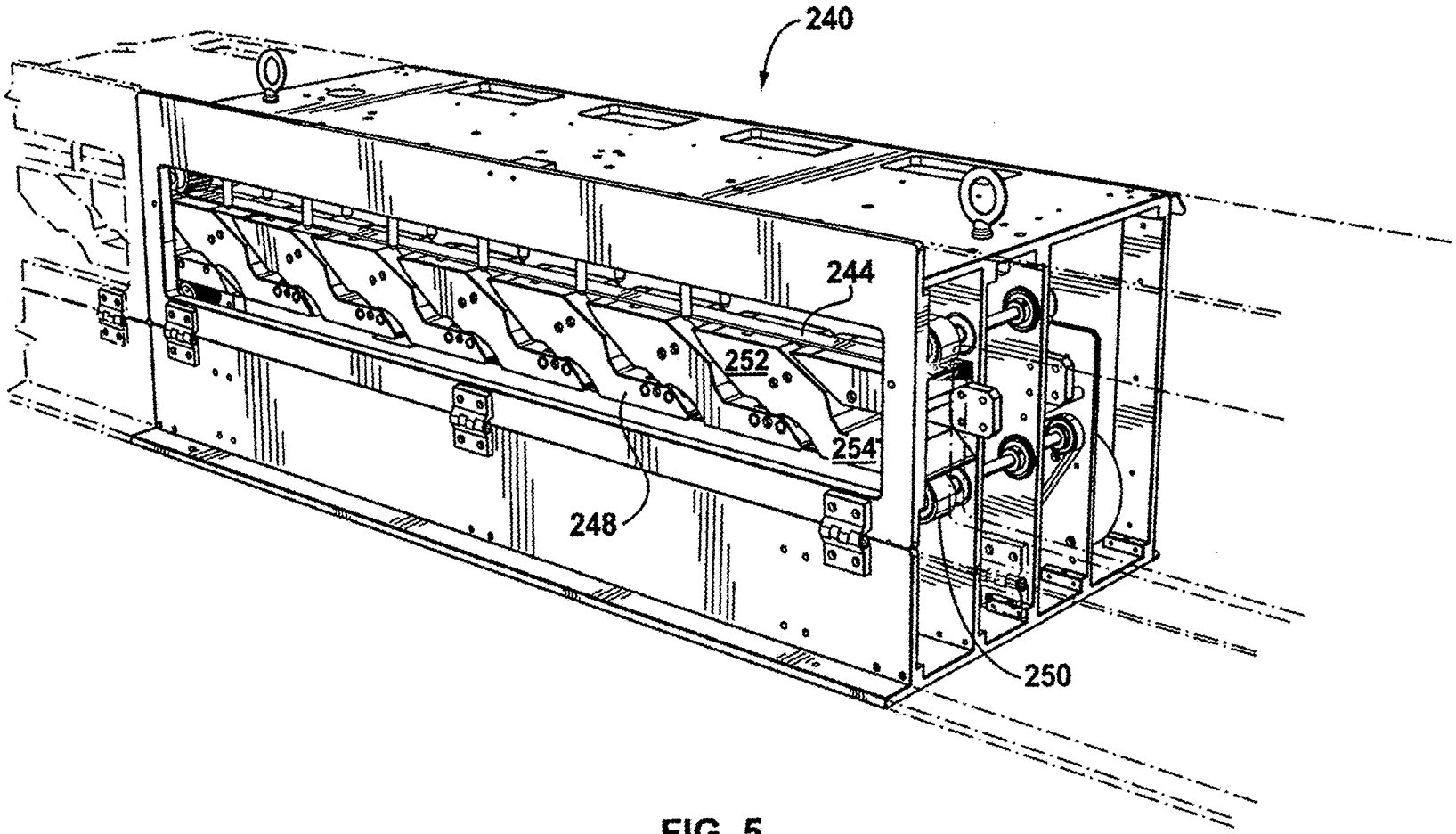
FIG. 5 is an enlarged perspective view of a portion of the machine of FIG. 4.
Figure 6:
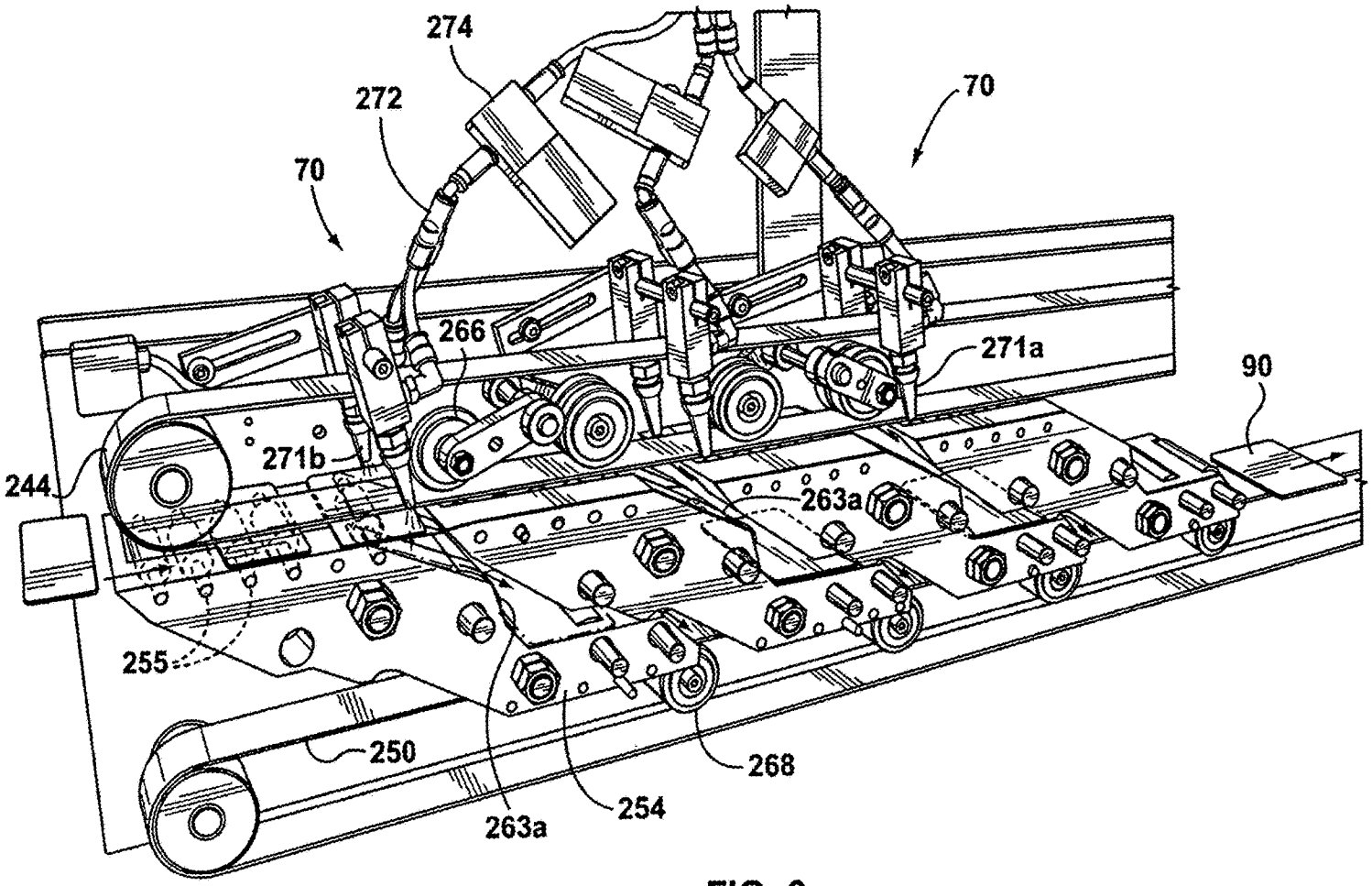
FIG. 6 is a partially cut-away perspective view of the portion of the machine of FIG. 5.
Figure 7:
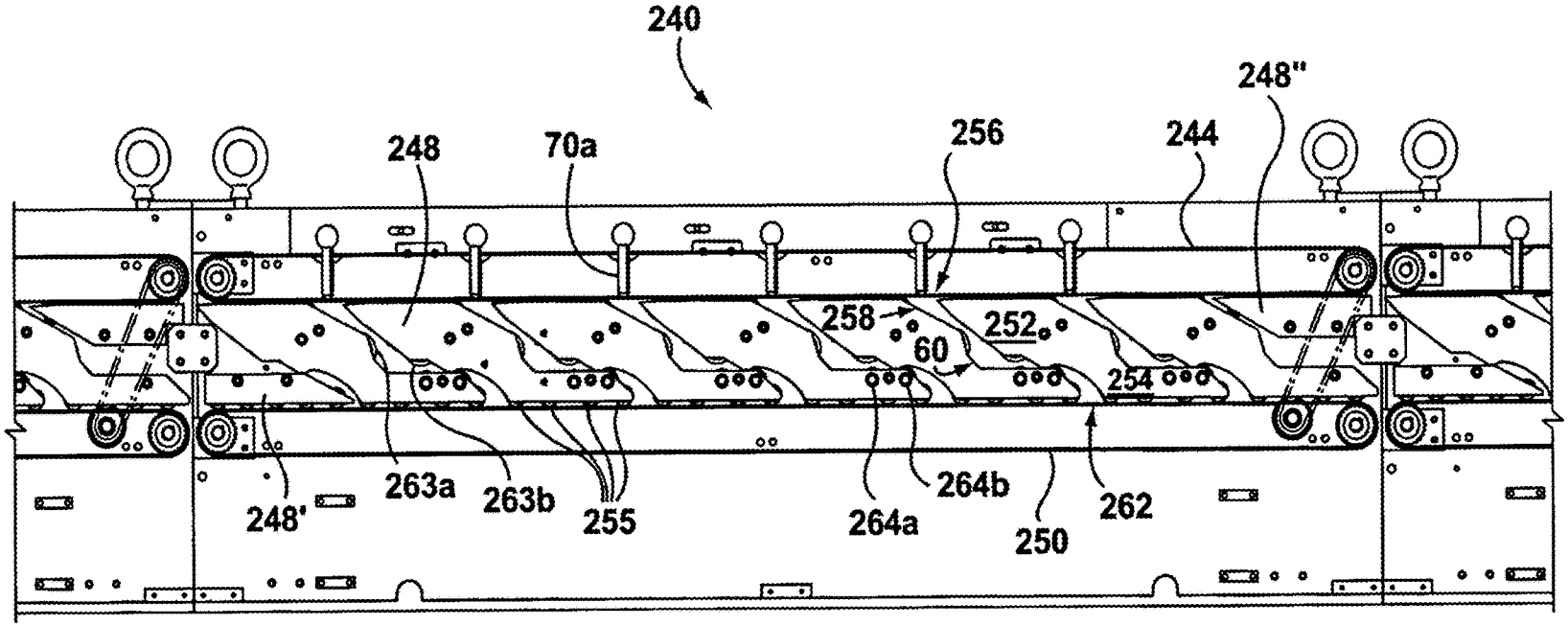
FIG. 7 is a side view of FIG. 5.

Card randomizing section 220 may be composed of a number of stand-alone sub-sections joined end-to-end. Turning to FIGS. 5 to 7, each sub-section 240 has an upper belt conveyor 244 overlying a series of blocks 248 and a lower belt conveyor 250 underlying the blocks 248. The upper 244 and lower 250 conveyors are driven off a common drive (not shown) and a gear ratio is chosen to set the relative speeds of these conveyors. In this regard, a 1:1 ratio is suitable. Each block 248 has an enlarged head 252 tapering to a foot 254 located downstream of the head. The top of each head and the bottom of each foot supports a series of rollers 255 to facilitate the movement of cards. The blocks provide a gapped platform, i.e., the blocks are positioned to provide a gap 256 between adjacent blocks. By virtue of the configuration of the blocks, each gap 256 has an inclined upper section 258 extending from the upper belt conveyor 244, a medial horizontal section which acts as a buffer 60, and a lower inclined section 262 extending between the buffer 60 and the lower belt conveyor 250. The buffers 60 are provided with card decelerating rollers 263a, 263b and with feed wheels 264a, 264b. The card decelerating rollers may be driven by the conveyor drive but geared to run at a lower speed. In this regard, a 1:5 ratio is suitable. The feed wheels 264a, 264b are driven by a motor (FIG. 5) selectively driven from a control input from processor 34'.

A series of support rollers 266 press the lower run of upper belt conveyor 244 against the top of the heads 252 of blocks 248 and a second series of support rollers 268 press the upper run of lower belt conveyor 250 against the bottom of the feet 254 of blocks 248.

A diverter 70 is associated with each buffer 60. The diverter comprises a pair of downwardly directed air nozzles 271a, 271b positioned above each gap 256 on either side of upper belt conveyor 244. Each pair of nozzles is fed with a bifurcated air line 272 which is selectively opened by a solenoid valve 274.

The block 248' at the upstream end of a sub-section 240 is identical to the foot 254 of a block 248 and the block 248" at the downstream end of the sub-section 240 is similar to the head 252 of a block 248. When the sub-sections are joined end-to-end, block 248" at the downstream end of one sub-section 240 acts as a lead-in to the head 252 of the upstream block 248 of the next sub-section 240. It will be apparent that each sub-section has six diverters 70 and associated buffers 60. Therefore, by joining nine sub-sections 240, fifty-four diverter/buffer stations may be provided.

Figure 8:
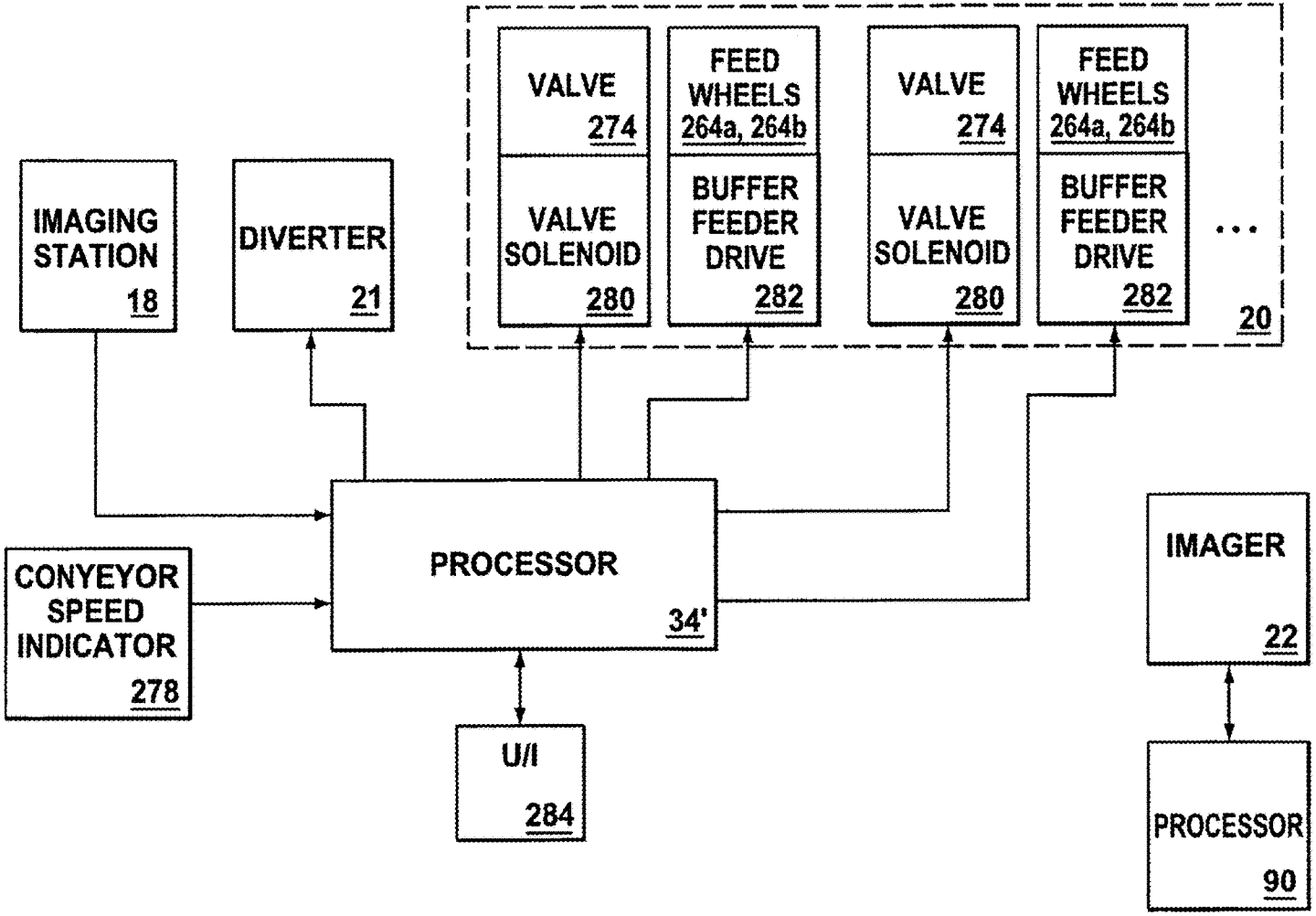
FIG. 8 is a schematic view of the control arrangement for the machine of FIG. 4.

FIG. 8 illustrates the control scheme for the machine 200. Turning to FIG. 8, the processor 34' receives an output from imaging station 18 and from a conveyor speed indicator 278 associated with the upper conveyor 244. The processor outputs to diverter 21 of ejection station 19. Additionally, the processor outputs to the valve solenoid 280 of each solenoid valve 274 of card randomizing section 220 and to the buffer feeder drive 282 for each pair of feed wheels 264a, 264b of the card randomizing section. The processor is also connected for two-way communication with a user interface 284. The second processor 90 is connected to imager 22.

The processor 34' may store one or more known randomizing algorithms. Optionally, a randomizing algorithm may request seeding inputs through user interface 284. Or a hardware random number generator may seed the randomizing algorithm.

To prepare machine 200 for operation, either the die cutting and card singulating units 212a, 212b may be loaded with sheets printed with card images and set to an active mode, or the card hopper 215 may be loaded with (unpackaged) decks of cards and set to an active mode.

In operation, if units 212a and 212b are in active mode, these units die cut cards from the sheets with which they are loaded and singulate these cards on conveyor 20". The card images are printed on each sheet such that after cutting and singulating, each singulated deck of cards has its conventional order. The units are co-ordinated so that singulated decks are fed to the conveyor 20" one at a time. If, instead, card hopper 215 is in active mode, then the card hopper feeds cards to provide singulated decks. Thus, in either event, singulated decks having the conventional card order are presented to the imaging station 18.

The processor can verify each expected card based on input from imaging station 18. On recognizing the non-standard cards in a deck (e.g., Jokers), or cards not meeting quality control standards, the controller can prompt diverter 21 of ejection station 19 to expel these cards from the line (such as by a puff of air). The remaining cards pass to the randomizing section 220. Note in this regard, as illustrated in FIG. 6, the cards 290 are fed such their short dimension is in the downstream feed direction D. The width of upper conveyor 244 is chosen to be less than that of the long dimension of the cards 290. In consequence, both ends of each card extends beyond either side of the conveyor 244.

A standard playing deck has fifty-two cards. One buffer 60 is allocated for each different card in such a deck. This allocation may be as follows: the first card in the deck (the King of hearts) is allocated to the first (most upstream) buffer; the second card (the Queen of hearts), is allocated to the next adjacent downstream buffer; and so on. In consequence, the last card, the Ace of diamonds, is allocated to the fifty-second buffer. The processor, input from conveyor speed indicator 278, is aware of when a given card arrives at a diverter 70. Consequently, when a card intended for a given buffer 60 arrives at the associated diverter 70, the controller controls the valve solenoid 280 for that diverter in order to temporarily open the associated valve 274 to deliver a puff of air from the associated nozzles 271a, 271b. This puff of air impacts both ends of the intended card, deflecting the card downwardly into the gap 256 leading to the buffer 60. In consequence, the card is diverted to this buffer and the decelerating rollers 263a, 263b assist in slowing the card toward a stop in a controlled fashion.

Each set of cards output from the machine 200 could be a single deck of fifty-two cards. In some cases, however, a casino wants sets of cards which are "superdecks" of four, six, or eight decks each. The randomizer may therefore be programmed to produce sets of cards which are superdecks. Independently of the input of cards to the buffers, the controller may randomly determine an order for the set of cards. By way of example, it is assumed a first set of cards is being fed toward the randomizer section 220 after start-up, such that all of its buffers are currently empty. And say, for example, the first few cards randomly chosen for the order of cards in this first set are as follows: eight of clubs; two of hearts; Queen of spades; seven of diamonds. Assuming cards are allocated to buffers as described above, this means the thirty-second buffer is allocated for each eight of clubs. Consequently, as soon as the controller diverts the first eight of clubs to the thirty-second buffer, it controls the buffer feeder drive 282 in order to rotate the feed wheels 264a, 264b in the thirty-second buffer. This causes the eight of clubs to feed directly to the lower conveyor 250 where it is conveyed toward deck forming and loading unit 224. By the time the eight of clubs has reached the thirty-second buffer, the first two of hearts and the first Queen of spades will already be stored in their respective buffers because these buffers (namely, buffers twelve and fifteen) are upstream of the thirty-second buffer. Thus, as soon as the processor 34' moves the eight of clubs to the lower conveyor, it can move the two of hearts from the twelfth buffer to the lower conveyor 250. The controller must then wait for the two of hearts passes the fifteenth buffer. The controller will be aware when this occurs due to indications from the conveyor speed indicator 278. And as soon as the two of hearts has past the fifteenth buffer, the controller can feed the Queen of hearts from the fifteenth buffer to the lower conveyor 250. The next card is the seven of diamonds. Likely, at the time the Queen of spades is fed to the lower conveyor, the first seven of diamonds has not yet reached its buffer—the forty-sixth buffer. Therefore, the processor must wait until the seven of diamonds reaches the gap 256 associated with the forty-sixth buffer, and then divert the seven of diamonds to this buffer and immediately feed it to the lower conveyor.

At the time the first twenty-six cards in the first deck have been fed to their respective buffers, which are the first twenty-six buffers, the last twenty-six cards of the first deck will be on the upper conveyor above these first twenty-six buffers. At this instant, the first card of the second deck, which is a King of hearts, will be next in line to progress onto the randomizing section 220. When the twenty-seventh card of the first deck, namely, the King of clubs, moves over the twenty-seventh buffer, it is diverted to this buffer. Assuming the cards of consecutive decks are fed without gaps between them, then at this instant, the king of hearts of the second deck will be over the first buffer. Consequently, it is diverted to this first buffer. If at this point the processor had not fed the King of hearts from the first deck to the lower conveyor, the first buffer would now store two cards.

It will be apparent that, in general, dependent upon the order of cards called for by the processor and the relative speeds of the upper and lower conveyors, several cards could accumulate in any given buffer.

Cards of a set fed to the lower conveyor pass to the deck forming and loading unit 224 which gathers the cards from the lower conveyor into a deck (or superdeck, as the case may be). In this regard, the imager 22 may be used to verify that a full set of cards has been gathered. The gathered deck may then be stuffed into a carton at the carton forming and loading station 226. The filled carton may then be sealed closed with a tamper evidencing seal at labeling unit 228. The packaged (super)deck is then ready for shipment.

By providing the randomizing section 220 with fifty-four buffers, optionally decks may be output which include Jokers.

Optionally, rather than feeding cards from a deck to the randomizing section 220 beginning with the top card, cards could be fed beginning with the bottom card. In such instance, the first card in a deck to arrive at the randomizing section 220 would be the Ace of diamonds. This card could be allocated to the first buffer, with the second card, the two of diamonds allocated to the second buffer, and so on.

It should be apparent that the system can cope with cards which arrive in a non-standard order since the processor can observe this order from the imaging station 18. Thus, where cards of a deck arrive in a non-standard order, the processor can still direct each different card to a pre-determined buffer.

A number of modifications are possible. For example, where the decks are guaranteed to arrive in a standard order and quality control is not an issue, imaging station 18 may be replaced with a simple card indicating mechanism, such as a photodiode which outputs to the controller. In the case that a photodiode is used, it will indicate arrival of each card which, in conjunction with the speed signal from the conveyor speed indicator 278, will allow the controller to divert each card to its appropriate buffer.

In another alternative, imaging station 18 may be dispensed with entirely and responsibility for diverting cards to appropriate buffers may be off-loaded from processor 34' to a simple logic circuit associated with each buffer. More specifically, an adding circuit may be associated with each buffer which, when it reaches a pre-defined count, resets and sends a pulse to the solenoid valve causing it to open the valve momentarily to provide a diverting puff of air. With this arrangement, the logic circuit may report back to the controller whether its associated buffer holds at least one card, or a card sensor may be provided at the output of each buffer which the controller monitors after activating the buffer feeder drive and waits until the sensor indicates a card is fed before moving on to the next card.

The described allocation of the first buffer to the first card in a deck (the king of hearts), and so on, could be replaced with other buffer allocation strategies.

Optionally, block 248' at the upstream end of a sub-section 240 could be designed to interfit with a block 248" at the downstream end of the next upstream sub-section so that blocks 248' and 248" may be joined to form a block 248. In such instance, a diverter 70 may be associated with each block 248".

Optionally, rather than driving the upper conveyor 244 and lower conveyor 250 off a common drive, each may be independently driven. In such instance, a speed indicator may be associated with each such conveyor to feed the controller with a speed indication signal.

In a modified approach, rather than allocating one buffer to each unique card in a set of cards, one buffer may be allocated to the ordinal position each card will have in the output stream on lower conveyor 250. With this approach, the processor first determines a random order for the cards in a set of cards and then places the cards in buffers based on this random order. Thus, the first card in the random order is placed in the buffer allocated to output the first card of the re-ordered set to the lower conveyor, the second card in the random order is placed in the buffer allocated to output the second card of the re-ordered set, and so on. Where the number of cards in a set exceeds the number of buffers (which will occur where the set is a superdeck of playing cards), each buffer is allocated to store a first card in at a given ordinal position in the re-ordered set and then subsequent cards at ordinal positions which comprise the given ordinal position plus multiples of fifty-two. For example, the buffer storing the third card in a randomly re-ordered set of playing cards is also used to store the $(3+52=)55^{th}$ card in the set, the $(3+52\times2=)107^{th}$ card, and so on. Then cards are output from the buffers based on the ordinal position of the buffers.

For example, the buffer at the downstream end of the randomizing section 220 may be allocated the first ordinal position, the next upstream buffer the second ordinal position and so on such that the buffer at the upstream end of the randomizing section is allocated the $54^{th}$ ordinal position (assuming there are fifty-four buffers in all). Then, cards are output to the lower conveyor in a repeating sequence from the buffers based on their ordinal position: first from the buffer in the first ordinal position, next from the buffer in the second ordinal position, and so on.

While machine 200, by virtue of its number of buffers 60, is specially adapted to handle playing cards, the machine may be provisioned with any number of buffers to adapt it to suitably handle different types of pre-printed cards.

Other modifications will be apparent to those skilled in the art and, therefore, the invention is defined in the claims.

What is claimed is:

1. A method of processing pre-printed cards, comprising:

feeding individual pre-printed cards of sets of cards, cards of each set pre-printed with an identical plurality of different markings such that, for each card of a given set, there is a like card in each other set pre-printed with markings that are identical to markings on said each card, singly through an imaging station;

for each card:

at said imaging station, imaging at least a corner of said each card *comprising imaging two edges of said each card which meet to form said corner and establishing a first search zone for a first edge of said two edges and a second search zone for a second edge of said two edges*;

based on said imaging, [(i)] *establishing a search zone having a pre-determined distance from, and orientation relative to, said corner and* identifying pre-determined markings on said each card *within said search zone*, if present[, and (ii)]*;*

*subsequent to said identifying,* determining a position and orientation of any said markings with respect to card edges forming said at least a corner;

based on said determining, further determining whether each said position and orientation are within a pre-determined tolerance;

if said position and orientation are not within said pre-determined tolerance, rejecting said each card and otherwise feeding said each card to one buffer of a plurality of buffers[such that each buffer stores the like card from each set]; *and* feeding [one card] *cards* from [each of] said buffers to a conveyor such that cards on said conveyor have a random order.

2. The method of claim 1 wherein said imaging at least a corner comprises imaging two diagonally opposed corners of said each card and wherein said determining said position and orientation of any said markings determines a position and orientation of first markings with respect to card edges forming a first of said corners and a position and orientation of second markings with respect to card edges forming a second of said corners.

3. The method of claim 2 further comprising imaging all corners of said each card and where a given corner does not have a pre-determined shape, rejecting said each card.

4. The method of claim 1 wherein said markings comprise indicia.

5. The method of claim 4 further comprising feeding said each card to one buffer of a plurality of buffers dependent upon pre-determined indicia identified on said each card.

6. The method of claim 4 where, on failure to identify predetermined indicia, rejecting said each card.

7. The method of claim 4 wherein said rejecting each card on failure to identify predetermined indicia comprises diverting said each card to a first reject path and wherein said rejecting each card where each said distance is not within said pre-determined tolerance comprises, where said pre-determined indicia were identified, diverting said each card to a second reject path.

8. The method of claim 1 further comprising accumulating cards fed from said buffers into decks.

9. The method of claim 8 further comprising imaging at least a portion of cards being accumulated into an accumulated deck, identifying card indicia from said imaging at least a portion of cards being accumulated into an accumulated deck and verifying a pre-determined property of cards in said accumulated deck based on said identifying card indicia from said imaging at least a portion of cards being accumulated into an accumulated deck.

10. The method of claim 8 further comprising wherein when one card is rejected, rejecting all cards which would otherwise have been assembled into a deck with said one card.

11. The method of claim 1 further comprising verifying said cards are fed through said imaging station.

12. The method of claim 1 further comprising receiving a stack of said cards and wherein said feeding comprises feeding from said stack.

13. The method of claim 1 wherein said feeding cards singly comprises feeding cards such that a long dimension of each card is transverse to a feed direction.

14. A method of processing pre-printed cards, comprising:

feeding individual pre-printed cards of sets of cards, cards of each set pre-printed with an identical plurality of different markings such that, for each card of a given set, there is a like card in each other set pre-printed with markings that are identical to markings on said each card, with each set comprising cards arranged in a first order, to a plurality of buffers [such that each buffer stores the like card from each set;] *and* feeding [one card] *cards* from [each of] said buffers to a conveyor such that cards on said conveyor have a random order as compared with said first order*;* further comprising accumulating cards fed from said buffers into decks;

wherein said feeding to a plurality of buffers [such that each buffer stores a like card from each set] comprises:

feeding cards singly through an imaging station;

for each card:

at said imaging station, imaging at least a corner of said each card *comprising imaging two edges of said each card which meet to form said corner and establishing a first search zone for a first edge of said two edges and a second search zone for a second edge of said two edges*;

based on said imaging, [(i)] *establishing a search zone having a pre-determined distance from, and orientation relative to, said corner and* identifying pre-determined markings on said each card *within said search zone*, if present[, and (ii)]*;*

*subsequent to said identifying,* determining a position and orientation of any said markings with respect to card edges forming said at least a corner;

based on said determining, further determining whether each said position and orientation are within a pre-determined tolerance;

where said position and orientation are not within said pre-determined tolerance, rejecting said each card.

15. The method of claim 14 wherein said feeding to a plurality of buffers such that each buffer stores the like card from each set comprises serially feeding individual pre-printed cards of consecutive sets of cards.

16. The method of claim 15 wherein, if a given buffer is full, rejecting a next card that would otherwise be directed to said given buffer.

17. The method of claim 15 further comprising receiving a stack of said cards and wherein said feeding comprises feeding from said stack.

18. The method of claim 15 wherein said buffering comprises serially conveying cards along a first conveyor to a plurality of buffers and diverting each card in a given set of cards into a different buffer.

19. The method of claim 18 further comprising dispensing cards to said first conveyor such that a long dimension of each card is transverse to a feed direction of said first conveyor.

20. A method of processing pre-printed cards, comprising:

feeding individual pre-printed cards of sets of cards, cards of each set pre-printed with an identical plurality of different markings such that, for each card of a given set, there is a like card in each other set pre-printed with markings that are identical to markings on said each card, with each set comprising cards arranged in a first order, to a plurality of buffers[such that each buffer stores the like card from each set]; *and* feeding [one card] *cards* from [each of] said buffers to a conveyor such that cards on said conveyor have a random order as compared with said first order, wherein said buffering comprises serially conveying cards along a first conveyor to a plurality of buffers and diverting each card in a given set of cards into a different buffer*;* wherein said feeding to a plurality of buffers such that each buffer stores the like card from each set comprises serially feeding individual pre-printed cards of consecutive sets of cards;

further comprising dispensing cards to said first conveyor such that a [long] *short* dimension of each card is [transverse to] *in* a feed direction of said first conveyor;

wherein a width dimension of said first conveyor is narrower than said long dimension of each card and wherein said diverting comprises blowing air *downwardly* against exposed opposite ends of a card.

21. A method of processing pre-printed cards, comprising:

feeding individual pre-printed cards of sets of cards with a first conveyor which exposes opposed margins of said cards, cards of each set pre-printed with an identical plurality of different markings such that, for each card of a given set, there is a like card in each other set pre-printed with markings that are identical to markings on said each card to a plurality of buffers such that each buffer stores the like card from each set;

said feeding comprising diverting each card into a buffer by blowing air against exposed opposed margins of each card;

feeding one card from each of said buffers to a second conveyor such that cards on said conveyor have a random order, wherein said first conveyor is an overlying conveyor riding along a gapped platform and wherein said diverting comprises blowing air against a given card at a gap in said platform in order to divert said given card into said gap, each gap leading to a different one of said buffers.

22. The method of claim 21 wherein said randomly feeding comprises randomly feeding to a second conveyor underlying said buffers.

23. The method of claim 22 wherein each set of cards comprises thirteen different cards in each of four suits.

24. The method of claim 23 wherein said first order comprises a progressive series of Ace through King or King through Ace of each of said four suits.

25. The method of claim 24 further comprising expelling cards which are other than one of said thirteen different cards in each of four suits.

26. The method of claim 24 further comprising gathering cards in a set of cards on said second conveyor into a deck.

27. The method of claim 21 further comprising dispensing cards to said first conveyor such that a long dimension of each card is transverse to a feed direction of said first conveyor, said exposed opposed margins comprising opposite ends of said each card.

[28. A method of processing pre-printed cards, comprising:

feeding individual pre-printed cards of sets of cards, cards of each set pre-printed with an identical plurality of different markings such that, for each card of a given set, there is a like card in each other set pre-printed with markings that are identical to markings on said each card, from an input to a plurality of card buffers such that each card buffer stores the like card from each set;

where a given card buffer is full, feeding any card intended for said given card buffer to an overflow buffer and from said overflow buffer back to said input;

feeding one card from each of said card buffers to a conveyor such that cards on said conveyor have a random order as compared with said first order.]

*29. A method of processing pre-printed cards, comprising:*

*feeding individual pre-printed cards of sets of cards, cards of each set pre-printed with an identical plurality of different markings such that, for each card of a given set, there is a like card in each other set pre-printed with markings that are identical to markings on said each card, with each set comprising cards arranged in a first order, to a plurality of buffers and feeding cards from said buffers to an output conveyor such that cards on said output conveyor have a random order as compared with said first order;*

*wherein feeding to and from said buffers comprises:*

*serially conveying cards along an upper conveyor overlying said plurality of buffers,*

*diverting cards downwardly from said upper conveyor into said plurality of buffers; and*

*feeding cards downwardly from said plurality of buffers to said output conveyor, said output conveyor underlying said plurality of buffers,*

*wherein said upper conveyor rides along a gapped platform and wherein said diverting comprises blowing air against a top surface of a given card at a gap in said platform in order to divert said given card into said gap, each gap leading to a different one of said buffers.*

* * * * *